US 007114156B2

(12) United States Patent
Le et al.

(10) Patent No.: US 7,114,156 B2
(45) Date of Patent: Sep. 26, 2006

(54) SYSTEM AND METHOD FOR PROCESSING MULTIPLE WORK FLOW REQUESTS FROM MULTIPLE USERS IN A QUEUING SYSTEM

(75) Inventors: Cuong M. Le, Tucson, AZ (US); Glenn R. Wilcock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 10/112,239

(22) Filed: Mar. 29, 2002

(65) Prior Publication Data

US 2003/0187909 A1    Oct. 2, 2003

(51) Int. Cl.
*G06F 9/46* (2006.01)
*G06F 15/173* (2006.01)
*G06F 12/00* (2006.01)

(52) U.S. Cl. ............... 718/103; 709/242; 711/121
(58) Field of Classification Search ........ 718/100–108; 709/207–229, 242; 710/305; 370/401; 711/121
See application file for complete search history.

(56) References Cited

U.S. PATENT DOCUMENTS

| | | | | |
|---|---|---|---|---|
| 5,559,984 A * | 9/1996 | Nakano et al. | ............. | 711/121 |
| 5,832,262 A * | 11/1998 | Johnson et al. | ............. | 718/102 |
| 6,108,683 A * | 8/2000 | Kamada et al. | ............. | 718/103 |
| 6,154,769 A * | 11/2000 | Cherkasova et al. | ........ | 709/207 |
| 6,442,631 B1 * | 8/2002 | Neufeld et al. | ............. | 710/107 |
| 6,499,077 B1 * | 12/2002 | Abramson et al. | .......... | 710/305 |
| 6,505,250 B1 * | 1/2003 | Freund et al. | ............. | 709/226 |
| 6,615,273 B1 * | 9/2003 | Pan | ............................ | 709/242 |
| 6,668,269 B1 * | 12/2003 | Kamada et al. | ............. | 718/103 |
| 6,816,907 B1 * | 11/2004 | Mei et al. | .................... | 709/229 |
| 6,952,422 B1 * | 10/2005 | Yamaguchi | ................. | 370/401 |

OTHER PUBLICATIONS

Lauter et al., "Abstract Specification of Resource Accessing Disciplines: Adequacy, Starvation, Priority and Interrupts", ACM Sigplan Notices, 1978, pp. 41-59.*
Thomasian, "Concurrency Control: Methods, Performance, and Analysis", ACM Computing Surveys, 1998, pp. 70-119.*

* cited by examiner

*Primary Examiner*—Meng Al T. An
*Assistant Examiner*—Jennifer N. To
(74) *Attorney, Agent, or Firm*—Scully, Scott, Murphy & Presser, P.C.; Robert J. Sullivan, Esq.

(57) ABSTRACT

A system and method for generating a key list structure forming a queue of users' work flow requests in a queuing system such that many requests from a single user will not prevent processing of requests from other users in the queuing system. The key list structure comprises keys associated with users' work flow requests, each key indicating a priority level associated with a request, a user identification (User ID) associated with a requestor, and, an assigned user priority value (UPV). The method assigns UPVs to user requests in a manner such that user request entries become interleaved in the key list structure to prevent a single user from dominating the request processing.

11 Claims, 2 Drawing Sheets

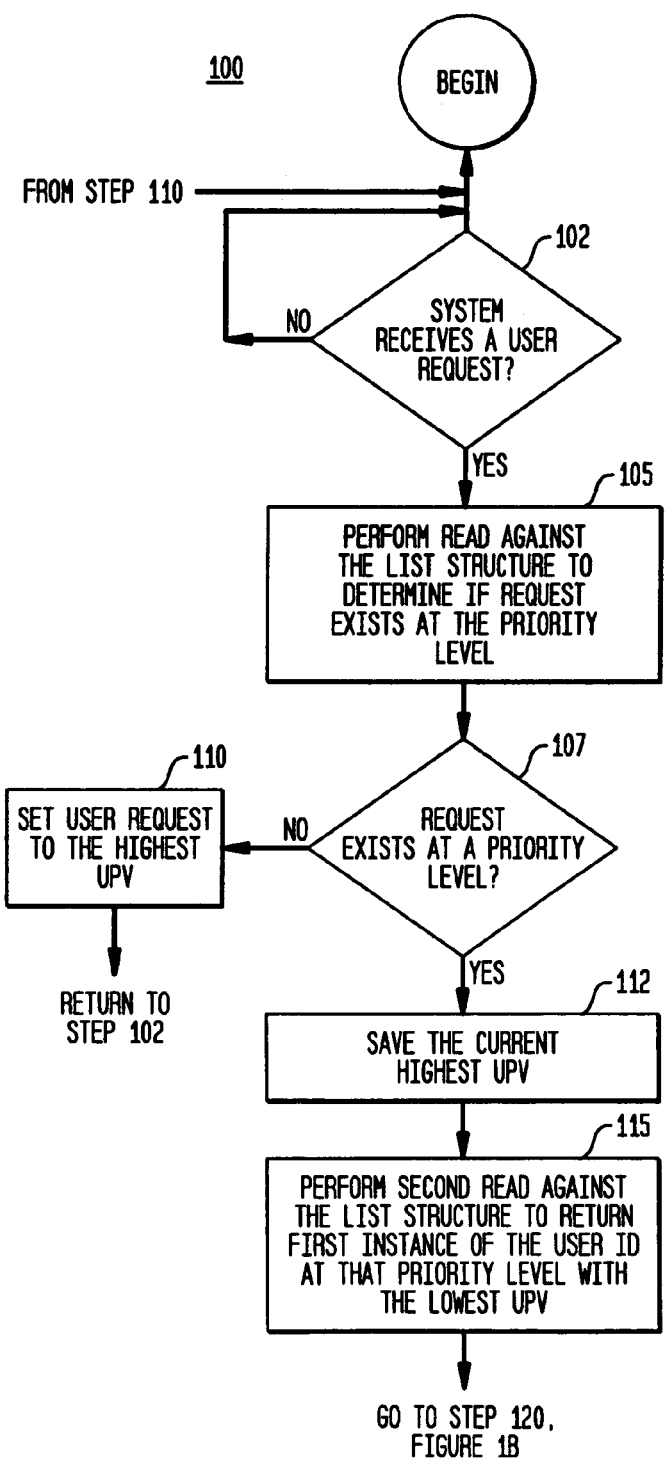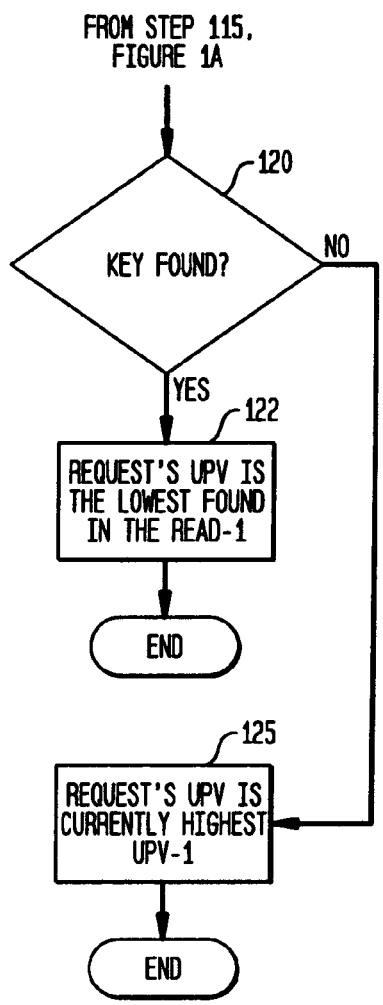
FIG. 1A
FIG. 1B

SYSTEM AND METHOD FOR PROCESSING MULTIPLE WORK FLOW REQUESTS FROM MULTIPLE USERS IN A QUEUING SYSTEM

BACKGROUND OF THE INVENTION

1. Field of the Invention

The present invention relates generally to computing systems involving a queue for accommodating multiple user requests, and particularly, to a novel method for handling process requests in a manner that prevents starvation of a user's request.

2. Discussion of the Prior Art

Priority queuing schemes are used in computing environments where certain requests are deemed to be of more importance than other requests.

For example, a particular environment may be established such that priorities are assigned to requests based on whether the requester is waiting for the request to complete before continuing processing (synchronous), or if the requestor will not wait for the request to complete before processing other work (asynchronous). Synchronous requests may be assigned a priority 100 and "no wait" requests are assigned a priority 50. Thus, when a request is submitted, it is placed on the work queue based on the priority of the request. Synchronous requests are placed at the head of the queue to be selected first, and asynchronous requests are placed at the tail of the queue to be processed only after all synchronous requests have been processed.

In such systems that implement a queue to process work requests, queue entries are generally placed on the queue in FIFO order or according to some designated priority. When a work request is being selected, the processor simply removes an entry from the Head/Tail of the queue. If a single user submits a large number of requests, and then a second user (of equal importance or priority) submits subsequent requests, then the second user's request undergoes processor starvation since it is unable to have any of its requests processed until all of the requests of the first user are completed. In this scenario, the FIFO queue creates a situation of unfairness by allowing a single user to dominate request processing and not allowing other requests from other users to be processed, even though all of the requests have equal priority.

While algorithms exist today that implement round robin using different physical queues, link lists, etc., none of these systems present a system for interleaving requests based on keys in a constrained environment. For example, IBM's Data Facility Storage Management Subsystem: Hierachical Storage Manager (DFSMShsm) (an element of the DFSMS/MVS software storage solution for the OS/390 and z/OS IBM mainframe operating systems), is a disk storage management and productivity tool for managing low-activity and inactive data. It provides backup, recovery, migration, and space management functions as well as full function disaster recovery. DFSMShsm improves disk use by automatically managing both space and data availability in a storage hierarchy by implementing a link list and organizing requests on that queue. Thus, when placing a new request, the system begins at the head of the queue and traverses the queue until an appropriate location for the new request is found based on the priority and the requestor. For example, if one person submits a new synchronous request, then the queue would have to be traversed until that person's last existing synchronous request, or until a person is found with the next lower priority. The worst case scenario is that the entire length of the queue must be traversed before finding the placement location for the new request.

Thus, it would be highly desirable to provide some fairness to the queuing system so that a single user can not dominate the processor while other users have to wait for the first user's requests to be complete.

It would be further highly desirable to provide a system and methodology for sorting such requests based on the submitter such that requests from different users are interleaved so that no one user has all of their requests selected for processing while other users' requests have to wait.

SUMMARY OF THE INVENTION

It is thus an object of the present invention to achieve a degree of "fairness" in a work flow system implementing a single queue for receiving user requests, by interleaving requests from different users on the single queue.

It is a further object of the present invention to achieve a degree of "fairness" in a work flow system implementing a single queue that provides for a "round robin" selection of requests (of equal priority weight requests) on a primarily FIFO/Priority queue implemented by a key sequenced list structure.

It is a further object of the present invention to provide a constrained work flow processing system implementing a single queue structure for holding user requests, that achieves a degree of "fairness" by organizing user requests based upon keys and in which a new request may be placed correctly and directly into a "keyed" structure with at most two reads and one write.

According to a preferred aspect of the invention, there is provided a system and method for organizing work flow requests for multiple users in a queuing system, the method comprising the steps of:

a) providing a key list structure comprising keys associated with users work flow requests, each key indicating a priority level associated with a request, a user identification (User ID) associated with a requestor, and, an assigned user priority value (UPV); and, b) for each current work flow request at an associated priority level for a User ID, performing a first read against the key list structure to determine whether a request entry already exists at that associated priority level; and, for a request entry already existing at that associated priority level:

i) saving a current highest assigned UPV value in the list;

ii) performing a second read of the key list structure to determine a first instance of the User ID at that priority level with the lowest assigned UPV;

iii) determining if a key was found in the structure for the User ID; and, iv) if a key is found, assigning the current user's request UPV to the lowest UPV decremented by one and placing the key in the list structure; and, if a key was not found, assigning the UPV for this current user's request to the current highest UPV value decremented by one and placing the key in the list structure, whereby many requests from a single user will not prevent processing of requests from other users.

The present invention improves existing technology by using Key Technology to manage the list, instead of linked lists. The use of Keys is available with existing applications such as the IBM Virtual Storage Access Method (VSAM) Data Set technology, and with Coupling Facility technology.

BRIEF DESCRIPTION OF THE DRAWINGS

Details of the invention disclosed herein shall be described below, with the aid of the figures listed below, in which:

FIGS. 1(a)–1(b) depict a flow chart illustrating the queue management algorithm according to the present invention.

DETAILED DESCRIPTION

Figure 2:
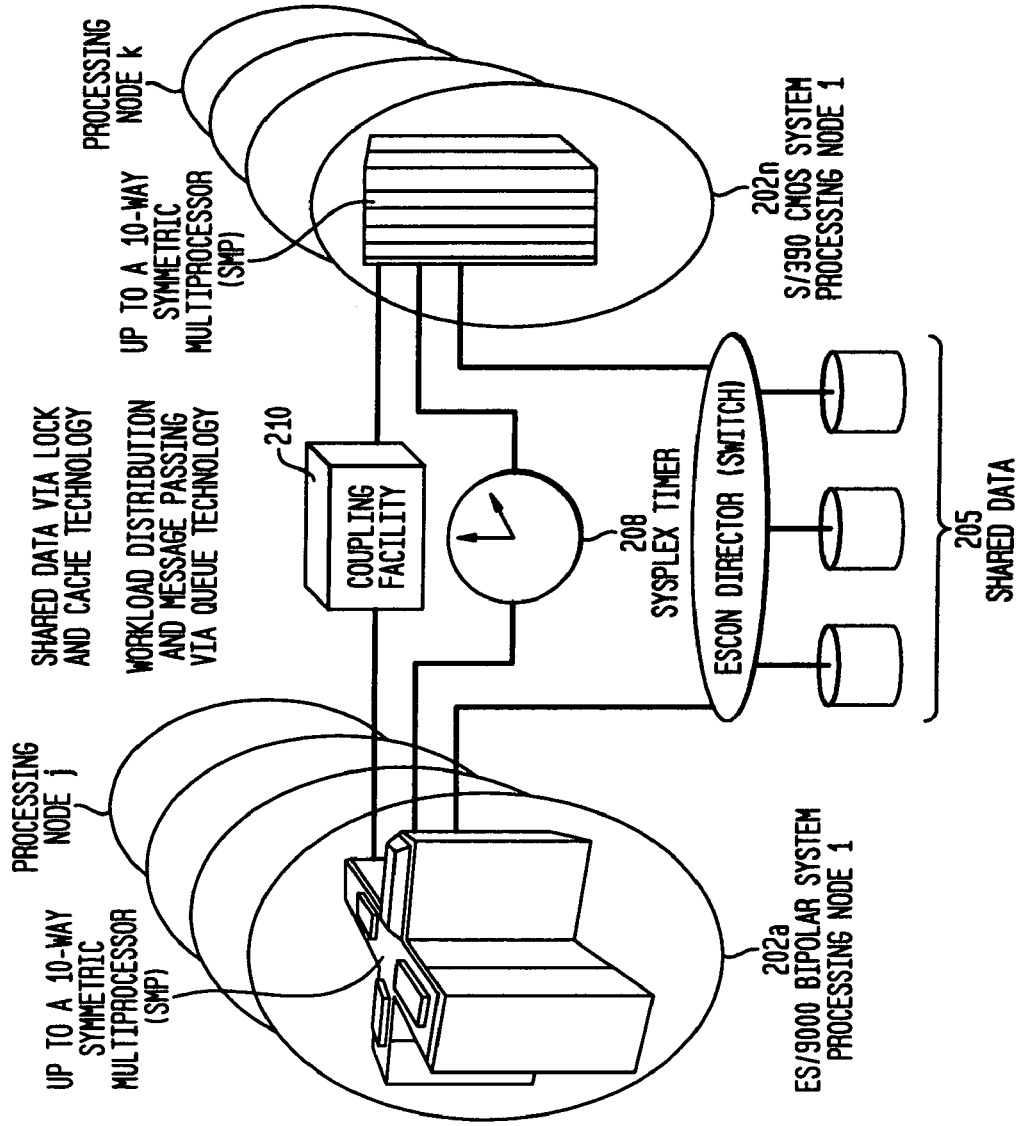
FIG. 2 is a system diagram illustrating an example implementation of the present invention in a computing system.

The present invention is directed to a novel approach to using keyed technology to generate "Keys" such that a new work request may be placed correctly and directly into the "keyed" structure with at most two reads and one write. This is a huge advantage over the use of a linked list which may require the entire length of the queue to be traversed.

The key-based queuing system of the present invention may be implemented in a Coupling Facility, which is a component provided in the IBM S/390 Parallel Sysplex comprising, for example, a cluster of interconnected processing nodes with attachments to shared storage devices, network controllers, and core cluster technology components, consisting of coupling facilities, coupling support facilities, and sysplex timers, and which includes a queue structure for providing FIFO and other priority based queuing. The queue however, is implemented on a key sequenced list structure such as will be described in greater detail with respect to Table 1. For purposes of discussion, it is assumed that all requests are at the same priority level.

The key structure depicting how requests are sequenced according to the interleaving (round robin) algorithm is now described with reference to Table 1 which illustrates the structure of the key which is used to sequence the requests.

TABLE 1

| Key | Bytes 15-14: Priority |
| | Bytes 13-11: User Priority Value |
| | Bytes 10-3: User id |
| | Byte 2-0: Optionally "Other identifying" characteristics such as processor id |

As shown in Table 1, the fields making up a key for reference in the key list, include one or more bytes indicating a priority, and one or more bytes indicating a User Priority Value (UPV), e.g., a number such as 64K or 65535, for instance; several bytes providing a user identification and, several bytes for optionally indicating other identifying characteristics such as a processor id.

FIGS. 1(a)–1(b) depict the interleaving (round robin) algorithm 100 according to the invention. As shown in FIG. 1(a), the algorithm 100 includes a first step 102 for determining system receipt of a user request. When a request is entered into the system, a first read is performed against the key list structure at step 105 and, at step 107, a determination is made as to whether the request exists at the priority level. If, at step 107 it is determined that the user request does not exist at the priority level, then at step 110, the Highest User Priority Value (UPV) for that user is set to the highest value, e.g., a number such as 65535. This request's user priority value is thus set to 65535, for example, and the system returns to process the next received user request. Otherwise, at step 107, if it is determined that the user request (entry) does exist in the key list structure at the priority level, then at step 112 the current highest UPV value is saved, and, at step 115, a second read of the key list structure is performed. In this second read, as indicated at step 115, the list structure returns the first instance of the User ID at that priority level with the lowest user priority value UPV. Afterward, as illustrated at step 120, FIG. 1(b), a determination is made as to whether a key was found. If a key is found, then this current user's request UPV is the lowest UPV found in the read decremented by one (i.e., lowest UPV–1) as indicated at step 122. Otherwise, at step 120, it is determined that a key was not found, then the process proceeds to step 125 to set the UPV for this user's request to its current highest UPV value decremented by one (i.e., highest UPV–1). Application of the foregoing algorithm essentially functions to interleave user requests who are waiting for processing time in a system.

The following Table 2 depicts an example of how requests would look on the queue interleaved. It is understood that user requests will be selected from the bottom of this list:

TABLE 2

| Priority | User Priority Value | User ID |
|---|---|---|
| 50 | 65531 | User1 |
| 50 | 65532 | User1 |
| 50 | 65533 | User1 |
| 50 | 65533 | User2 |
| 50 | 65534 | User1 |
| 50 | 65534 | User2 |
| 50 | 65534 | User3 |
| 50 | 65535 | User1 |

A simple example illustrating how the algorithm functions, is now described. In this example, it is assumed that a first request from a user at a priority level is assigned a user priority value such as 65535 (for example). Subsequent requests from the same user at the same priority level will have a user priority value that is decremented by 1 (such as 65534 for the second and 65533 for the third, etc.). The first request by another user at the same priority level will begin with a user priority value of one less than the highest user priority value, in this case it will be 65534 (65535-1), this is to ensure that the first user will have its request processed before subsequent users' requests are.

With a link-list architecture, the list must be scanned in order to find the correct insertion point or new entries. The keyed architecture according to the invention enables direct access to entries. Thus, the introduction of the user priority value (UPV) which enables a new UPV to be generated with a maximum of two reads (FIGS. 2(a), (b)) is a feature that is taken advantage. Thus, insertion is more efficient with this invention.

Another advantage of this solution is that it is self-contained within a single list. Other possible solutions involve maintaining a separate list to determine which users have requests and how many.

FIG. 2 illustrates a computing system known as the IBM S/390 Parallel Sysplex that includes an IBM z/OS operating system, e.g., running on an IBM S/390™ processor, in which the present invention may be implemented. As shown in FIG. 2, the IBM S/390 Parallel Sysplex 200 comprises a cluster of interconnected processing nodes 202a, . . . ,202n with attachments to shared storage devices 205, network controllers, and core cluster technology components, consisting of coupling facilities, coupling support facilities, and sysplex timers 208. The IBM z/OS Coupling Facility 210 may be provisioned with the key list structure of the present invention to enable high-performance read/write sharing of data by applications running on each node of the cluster through global locking and cache coherency management mechanisms, and further provide cluster-wide queuing mechanisms for workload distribution and message passing between nodes. A sysplex timer serves as a common time reference source for systems in the sysplex, distributing synchronizing clock signals to all nodes. This enables local processor time stamps to be used reliably on each node and synchronized with respect to all other cluster nodes, without requiring any software serialization or message passing to maintain global time consistency.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method implemented in a computing environment having shared computing resources and implementing a queuing system for organizing work flow requests for said computing resources for multiple users, said method comprising the steps of:
   a) said queuing system providing a key list structure comprising keys associated with users' work flow requests, each key indicating a priority level associated with a request, a user identification (User ID) associated with a requestor, and, an assigned user priority value (UPV); and,
   b) for each current work flow request indicating an associated priority level and User ID for a requestor, performing a first read against said key list structure to determine whether a request entry already exists in said key list structure by a key at that associated priority level; and, for a request entry already existing at that associated priority level:
      i) saving a current highest assigned UPV value in said key list structure;
      ii) performing a second read of the key list structure to determine a first instance of the same User ID at that priority level with the lowest assigned UPV;
      iii) determining if a key was found in said key list structure for said same User ID at that priority level with the lowest assigned UPV; and,
      iv) if a key is found, assigning the current user's request UPV to the lowest assigned UPV decremented by one and placing said key in said key list structure; and, if a key for said same User ID at that priority level was not found, assigning the UPV for this current user's work flow request to the current highest UPV value decremented by one and placing said key in said key list structure,
   whereby many requests from a single user will not prevent processing of requests from other users.

2. The method as claimed in claim 1, wherein at step b), if a request entry does not exist at that associated priority level, the step of setting the current entry's user priority value to a first UPV value and placing said key in said list structure.

3. The method as claimed in claim 2, wherein said first UPV value corresponds to a highest UPV value for said system.

4. The method as claimed in claim 2, wherein work flow requests for multiple users are processed in accordance with a request's assigned UPV value in said key list structure.

5. A system implemented in a computing environment having shared computing resources and implementing a queuing system for handling work requests for said computing resources from multiple users, said system comprising:
   means for generating a key list structure comprising keys associated with users work flow requests, each key indicating a priority level associated with a request, a user identification (User ID) associated with a requestor, and, an assigned user priority value (UPV);
   means for determining from said key list structure whether a work flow request entry already exists in said key list structure for a requestor having a key at that associated priority level and, saving a current highest assigned UPV value in said key list structure when a request entry already exists at that associated priority level;
   means for determining from keys in said key list structure a first instance of the same User ID at that priority level with the lowest assigned UPV;
   means for determining if a key was found in said key list structure for said same User ID at that priority level with the lowest assigned UPV; and,
   means for assigning the current user's request UPV to the lowest assigned UPV decremented by one if a key is found and placing said key in said list structure; and, if a key for said same User ID at that priority level was not found, assigning the current user's work flow request UPV to the current highest UPV value decremented by one and placing said key in list structure,
   whereby many requests from a single user will not prevent processing of requests from other users in said queuing system.

6. The system as claimed in claim 5, wherein said means for determining from said key list structure whether a request entry already exists at that associated priority level further includes means for setting the current entry's user priority value to a first UPV value if a request entry does not exist at that associated priority level and placing said key in said list structure.

7. The system as claimed in claim 6, wherein said first UPV value corresponds to a highest UPV value for said system.

8. The system as claimed in claim 6, further including means for processing work flow requests for multiple users in accordance with a request's assigned UPV value in said key list structure.

9. A program storage device, tangibly embodying a program of instructions executable by a machine to perform a method implemented in a computing environment having shared computing resources and implementing a queuing system for organizing work flow requests for said computing resources for multiple users, said method comprising steps of:
   a) said queuing system providing a key list structure comprising keys associated with users work flow requests, each key indicating a priority level associated with a request, a user identification (User ID) associated with a requestor, and, an assigned user priority value (UPV); and,
   b) for each current work flow request indicating an associated priority level and User ID for a requestor, performing a first read against said key list structure to determine whether a work flow request entry already exists in said key list structure by a key at that associated priority level; and, for a request entry already existing at that associated priority level:
i) saving a current highest assigned UPV value in said key list structure;
ii) performing a second read of the key list structure to determine a first instance of the same User ID at that priority level with the lowest assigned UPV;
iii) determining if a key was found in said key list structure for said same User ID at that priority level with the lowest assigned UPV; and,
iv) if a key is found, assigning the current user's request UPV to the lowest assigned UPV decremented by one and placing said key in said key list structure; and, if a key for said same User ID at that priority level was not found, assigning the UPV for this current user's work flow request to the current highest UPV value decremented by one and placing said key in said key list structure, whereby many requests from a single user will not prevent processing of requests from other users.

10. The program storage device according to claim 9, wherein if a request entry does not exist at that associated priority level, the method further comprising the step of setting the current entry's user priority value to a first UPV value and placing said key in said list structure.

11. The program storage device according to claim 10, wherein said first UPV value corresponds to a highest UPV value for said system.

* * * * *